(12) United States Patent
Jun et al.

(10) Patent No.: US 7,050,115 B2
(45) Date of Patent: May 23, 2006

(54) WIPE AND SPECIAL EFFECT DETECTION METHOD FOR MPEG-COMPRESSED VIDEO USING SPATIO-TEMPORAL DISTRIBUTION OF MACRO BLOCKS

(75) Inventors: Sung Bae Jun, Seoul (KR); Kyoung Ro Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 647 days.

(21) Appl. No.: 09/907,718

(22) Filed: Jul. 19, 2001

(65) Prior Publication Data
US 2002/0027616 A1   Mar. 7, 2002

(30) Foreign Application Priority Data
Jul. 19, 2000   (KR) .............................. 2000-41455

(51) Int. Cl.
*H04N 5/14* (2006.01)
*H04N 11/02* (2006.01)

(52) U.S. Cl. .................. 348/700; 375/240.26
(58) Field of Classification Search ..............................
375/240.01–240.06, 240.08–240.09, 240.12–240.16,
375/240.24; 348/699–700
See application file for complete search history.

(56) References Cited
U.S. PATENT DOCUMENTS

| | | | |
|---|---|---|---|
| 5,911,008 A * | 6/1999 | Niikura et al. | 382/236 |
| 5,987,180 A * | 11/1999 | Reitmeier | 382/236 |
| 6,314,209 B1 * | 11/2001 | Kweon et al. | 382/243 |
| 6,466,624 B1 * | 10/2002 | Fogg | 375/240.27 |
| 6,600,784 B1 * | 7/2003 | Divakaran et al. | 375/240.14 |
| 6,618,439 B1 * | 9/2003 | Kuo et al. | 375/240.16 |
| 6,636,565 B1 * | 10/2003 | Kim | 375/240.27 |
| 6,665,346 B1 * | 12/2003 | Lee et al. | 375/240.29 |
| 6,721,454 B1 * | 4/2004 | Qian et al. | 382/224 |

\* cited by examiner

*Primary Examiner*—Vu Le
*Assistant Examiner*—Dave Czekaj
(74) *Attorney, Agent, or Firm*—Fleshner & Kim, LLP

(57) ABSTRACT

A wipe and special effect detection method in a gradual shot transition method used for editing a video stream is described. In a compressed domain of a video stream based on a picture difference between frames such s MPEG, (a) an interval, on which areas where intra-coded macro blocks (ICMB) are concentrated, is obtained and the interval is judged as a shot transition interval by a wipe and special effect when a running time of the corresponding interval exceeds a predetermined time period, (b) a corresponding interval is judged as shot transition by a wipe and special effect, provided that a count of intra-coded macro blocks in an image attained by projecting macro blocks in an interval where ICMB concentrated areas appear continuously on a temporal axis exceeds a predetermined threshold value, and (c) an interval where a ratio of intra-coded macro blocks is over a predetermined threshold value continues over/during a predetermined time is judged as a shot transition occurring interval by a wipe and special effect.

15 Claims, 8 Drawing Sheets

WIPE AND SPECIAL EFFECT DETECTION METHOD FOR MPEG-COMPRESSED VIDEO USING SPATIO-TEMPORAL DISTRIBUTION OF MACRO BLOCKS

BACKGROUND OF THE INVENTION

1. Field of the Invention

The present invention relates to a method for detecting a gradual shot transition used for editing a video stream, and more particularly to a wipe and special effect detection method based on the spatio-temporal distribution and variance characteristics of macro blocks.

2. Background of the Related Art

[Video Indexing and Non-linear Browsing Method]

Development of digital video and image/video recognition technologies contributes the searching/filtering and browsing of a video in part wanted by a user. The basic techniques for the non-linear video browsing and search are shot segmentation and shot clustering, which are the cores of analyzing a video.

Therefore, many studies have been made to the shot segmentation, while studies for the shot clustering are launched.

FIG. 1 shows an example of a non-linear video browsing interface.

Numerals 100, 101, 102, and 103 designate a table of contents, a display screen, a frame representing a specific interval, and a graphic of function keys for browsing.

Using an interface (table of contents interface: TOC interface) as shown in FIG. 1, a user enables to access an interesting part of a video without viewing an entire video. Such an interface is greatly useful for a digital video browsing method. It is known that shot segmentation and shot clustering are very important for this video browsing.

[Relations Between Shot Segmentation And Shot Clustering]

FIG. 2 shows a diagram illustrating the relation between shot segmentation and shot clustering.

A video stream is divided into scene units (each of which may be further divided into sub scenes). The respective scenes are divided into shots each of which consists of a sequence of video frames.

Shot segmentation is a technique for dividing a video into the respective individual shots. And, shot clustering is a technique of constituting a video structure with logical scene units by combining similar shots together in the individual shots on the basis of the time/image/motion/audio similarity.

[Shot Transition and Scene]

A shot means a sequence of video frames attained from a camera without interruption and is a basic unit for the analysis and construction of a video.

Generally, a video is constructed with connections of lots of shots. And, the shot connection is achieved by using various editing effects. The most widely used shot transition method uses hard cut. The video editing effects are mainly divided into abrupt shot transition (hard cut) and gradual shot transition. Further, the gradual shot transition methods are fade, dissolve, wipe, other special effects and the like.

Compared to abrupt shot transition, gradual shot transition is seldom used in general. Yet, gradual shot transition has special meanings different from those of abrupt shot transition.

For instance, the technique of fade-in/out mostly means the past review or the beginning of a new scene. And, the dissolve editing effect is mostly used for the scene transition as shot transition of a large unit as well as the other shot transition of a small unit.

In this case, a scene, which is constructed with a plurality of shots or sub scenes, means a construction unit of a logical story. Wipe and other special effects, which are widely applied to shot transition of scene units, belong to one of the editing effects as well.

When information about a program genre or content characteristics is known, detection of the gradual shot transition may be used as a very important clue for the segmentation of a video stream into units of logical story construction.

Therefore, the detection of gradual shot transition is important for the development of a shot clustering method as well as shot segmentation.

[Related Art 1: Twin Comparison Method]

It has been reported that shot segmentation using global color distribution of a color histogram based method is the most excellent through various study results.

Yet, the shot segmentation method using global color distribution based on color histogram is very efficient in detecting abrupt shot transition but very poor at detecting gradual shot transition.

Accordingly, many efforts have been made to study for detecting gradual shot transition.

Zhang et al. proposed a twin comparison method for distinguishing and detecting abrupt shot transition and gradual shot transition. A twin comparison method uses a method of distinguishing abrupt shot transition from gradual shot transition by establishing two threshold values and comparing a size of picture difference between frames to the two threshold values.

Unfortunately, this method fails to distinguish various gradual shot transition methods and brings about many false alarms and miss alarms due to sensitivity to a camera motion or an object movement. And, an execution speed of the method is slow since this method requires picture differences between neighboring frames continuously.

[Related Art 2: Method Using Edge Image Picture Difference]

W. Wolf et al. proposed a multi step wipe shot transition detection method based on an edge variance statistics attained by pixel unit processing and a picture difference between frames of pixel unit.

The method of W. Wolf et al. is characterized in that an area where movement is detected and a characteristic of the wipe shot transition technique is compares to a modeling.

However, this method requires image decoded by frame unit for edge transition and needs to scan all the frame data for detecting the edge, thereby requiring lots of processing.

[Related Art 3: Edge Change Fraction and Method Using The Same Transition]

R. Zabih et al. proposed a method, which surveys a ratio between entering edge and exiting edge and detects and classifies wipe and shot transition on the basis of the variance ratio.

Unfortunately, this method requires entire frames to be decoded at a level of a picture for detecting edge and needs image unit matching to judge whether the edge is new entering edge, exiting edge, or the previous edge, thereby reducing the processing speed.

[Reasons for the Requirement of Processing in Compressed Domain: Execution Speed Matter]

In general, moving pictures data have problems in storage and transmission due to the large capacity. In order to overcome this capacity problem, a scheme of compressing data by various image processing techniques and restoring images is used. MPEG is the most widely representing compression method.

Lately, methods are developed for performing shot segmentation directly in a compressed domain using the characteristic of the compression technique of the MPEG stream without decoding a MPEG-compressed video to a picture level. A major reason for carrying out shot segmentation in a compressed domain is the application to a real time system or the fast indexing of large capacity multimedia database. The performance of the shot segmentation method in the compressed domain is similar to that of a method in a non-compressed domain, and a performance speed of the shot segmentation method in the compressed domain is relatively fast.

[Disadvantage Summary of the conventional method and Task of the Present Invention: Method Having Excellent Performance and Fast Performance Speed]

Briefly, the previous studies result in slow method performance speed for the application to real time environment, thereby failing to be applied to a real time video indexing system as well as having poor detection performance.

SUMMARY OF THE INVENTION

Therefore, an object of the invention is to solve the above problems and/or disadvantages and to provide at least the advantages described hereinafter.

An object of the present invention is to provide a method for detecting a wipe and special effect for MPEG-compressed video using spatio-temporal distribution of macro blocks.

Another object of the present invention is to provide a wipe and special effect detection method, in which a processing speed is very fast and a detection performance is excellent by carrying out most of the processing in an MPEG-compressed domain.

Further object of the present invention is to provide a wipe and special effect detection method that can improve overall performance of video shot transition detection algorithm.

Still further object of the present invention is to provide a wipe and special effect detection method that detected wipe and special effects can be provided as a video clustering input for a non-linear video browsing and searching.

In one aspect of the present invention, a wipe and special effect detection method according to the present invention includes the steps of detecting spatio-temporal distribution characteristics of intra-coded macro blocks in a compressed domain of a video stream based on inter-frame differences, applying spatio-temporal limiting conditions to the detected spatio-temporal distribution characteristics of the intra-coded macro blocks, and judging whether shot transition by wipe and special effect occurs, depending on whether the applied spatio-temporal limiting condition is satisfied.

In another aspect of the present invention, a wipe and special effect detection method according to the present invention includes the steps of detecting an intra-coded macro block band (ICMBB), an area that intra-coded macro blocks are concentrated, by projecting the intra-coded macro-block in a compression domain of the video stream, and judging whether shot transition by wipe and special effect occurs by applying a spatio-temporal limiting condition to the consecutive frames having the detected intra-coded macro-block band.

According to the above aspect of the present invention, if a running time of an interval [b,e], in which intra-coded macro-block bands (ICMBB) are continuously appeared, exceeds predetermined time period, the corresponding interval is determined that a shot transition by a wipe and special effect occurs.

In a further aspect of the present invention, a wipe and special effect detection method according to the present invention includes the steps of detecting a sequence [b,e] of frames on which intra-coded macro-blocks are concentrated in the compression domain of the video stream; projecting maximum connection components of the intra-coded macro blocks in the detected frame sequence on a temporal axis, and judging whether shot transition by wipe and special effect occurs by applying a spatio-temporal limiting condition to the projected image.

According to the above aspect of the present invention, if the number of intra-coded macro-blocks in the projected image exceeds predetermined threshold value, the corresponding interval is determined that a shot transition by a wipe and special effect occurs.

In another further aspect of the present invention, a wipe and special effect detection method according to the present invention includes the steps of detecting a consecutive P-frame sequence [b,e] of which count of intra-coded macro-blocks exceeds a predetermined threshold value, and judging whether shot transition by wipe and special effect occurs by applying a spatio-temporal limiting condition depending on whether a running time of the detected P-frame sequence continues over a predetermined time period or not. Moreover, according to the present invention, the above methods are used alone and can be used by combination It is to be understood that both the foregoing general description and the following detailed description are exemplary and explanatory and are intended to provide further explanation of the invention as claimed.

BRIEF DESCRIPTION OF THE DRAWINGS

The invention will be described in detail with reference to the following drawings, in which like numerals refer to like elements.

DETAILED DESCRIPTION OF THE PREFERRED EMBODIMENTS

Figure 1:
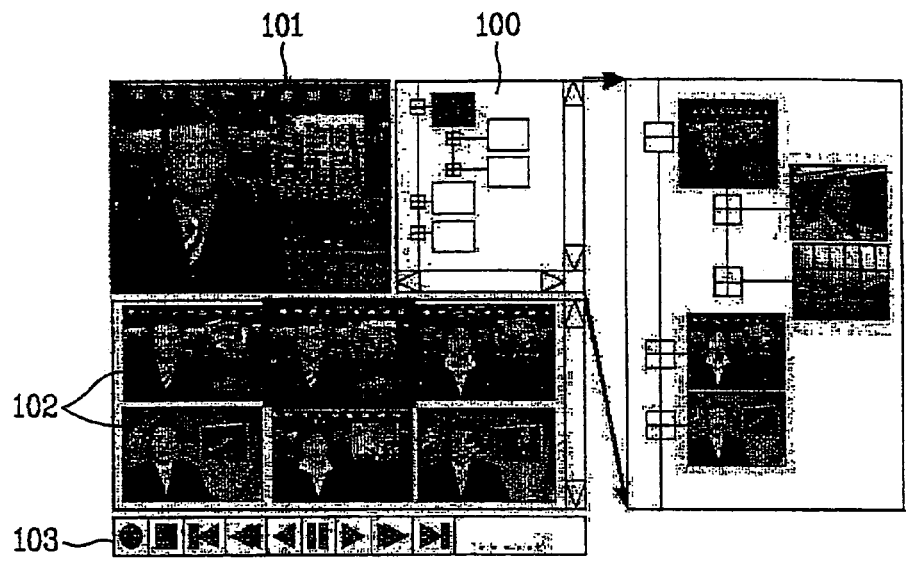
FIG. 1 shows an example of a non-linear video browsing interface.
Figure 2:
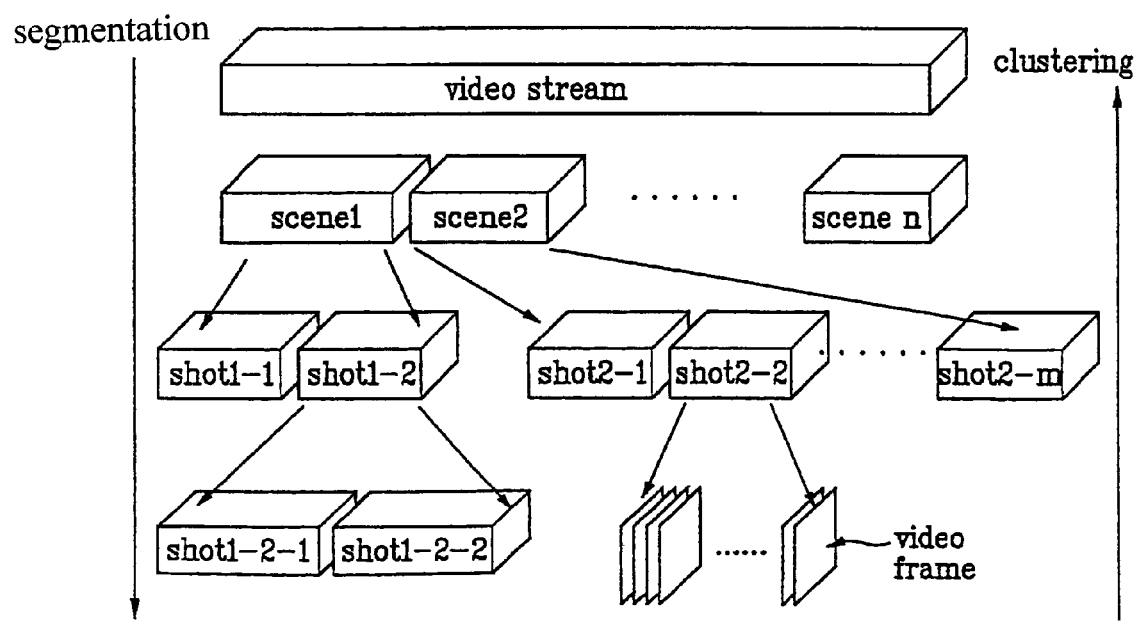
FIG. 2 shows a diagram illustrating the relation between shot segmentation and shot clustering.

Hereinafter, preferred embodiments of the present invention will be described in more detail.

Reference will now be made in detail to the preferred embodiments of a wipe and special effect detection method using spatio-temporal distribution of macro blocks in MPEG-compressed video environment according to the present invention, examples of which are illustrated in the accompanying drawings. Where possible, the same reference numerals will be used to illustrate like components throughout the specification.

[Wipe and Special Effect]

A wipe is a shot transition technique by which another shot region as a shape of straight line/curved line/figure moves on a screen when carrying out transition from one shot to another. In various gradual shot transitions having a form similar to the wipe, the rest of shot transition failing to belong to the categories of fade, dissolve and wipe is called a special effect.

Figure 3:
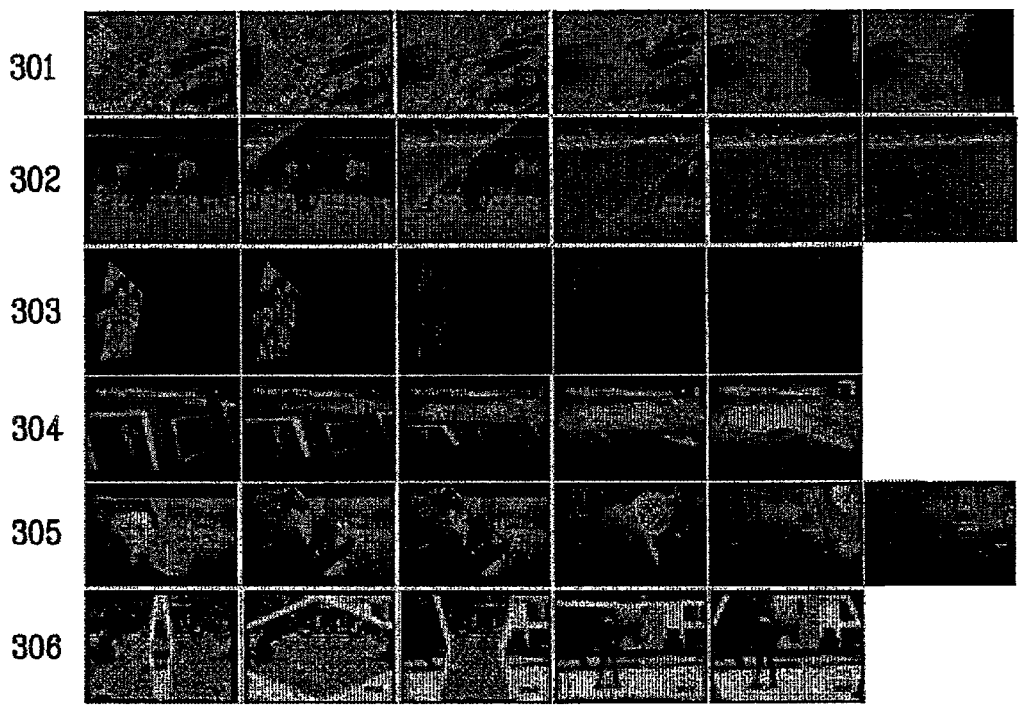
FIG. 3 shows pictures for illustrating shot transition techniques according to various wipes and special effects.

FIG. 3 shows shot transition techniques according to various wipes and special effects used in video edition.

As described in FIG. 3, there are various kinds of wipes and special effects in their formations or proceeding directions. With the development of technique, more kinds of wipes and special effects can be introduced and evolved.

In FIG. 3, a shot transition technique denoted by a numeral 301 is a technique that a following picture is overlapped with a disappearing present picture, a shot transition technique denoted by a numeral 302 is a technique that a following picture entering from a left upper edge of a screen, a shot transition technique denoted by a numeral 303 is a technique that a following picture is gradually magnified from a right part of a screen, a shot transition technique denoted by a numeral 304 is a technique that a following picture proceeds to enter from both top and bottom of a screen, a shot transition technique denoted by a numeral 305 is a technique that a following picture appears from a left bottom edge like turning over the leaves of a book, and a shot transition technique denoted by a numeral 306 is a technique that a following shot shows up like putting away a badge.

[MPEG, H.26x Standard Frame Species and Macro-Block, Motion Vector, Motion Prediction and Compensation]

Figure 4:
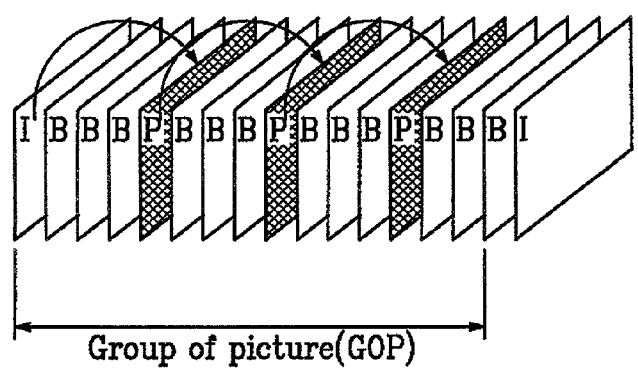
FIG. 4 shows an example of a GOP structure of MPEG stream.

FIG. 4 shows a GOP (group of pictures) structure of MPEG stream represented in display order for explaining a method according to the present invention.

I, B, and P type frames exist in MPEG. An I-frame is a frame encoded by a JPEG compression technique using spatial cohesiveness appearing generally in an image purely without influence of other frames. A P-frame is a frame encoded by motion prediction/compensation by macro-block unit using the previous I-frame or P-frame as a reference frame. And, a B-frame is a frame encoded by bi-directional motion prediction/compensation using the previous and next I or P-frames as a reference for calculating a motion vector.

Thus, the macro blocks are mainly divided into intra, forward-predicted, backward-predicted, and interpolated types.

All the macro blocks are intra-coded in the I-frame. Intra and forward-predicted type macro blocks are in the P-frame allowing only forward-prediction. And, all the macro blocks of the above four types may exist in the B-frame.

A coding process is carried out by using macro blocks in an encoding method of ITU H.26x but allows no B type frame.

The present invention detects an wipe and special effect by using distribution and its variance in a macro-block type space-time, in which macro-block type distribution is used not for the I or B type frame but for the P type frame.

Therefore, a method according to the present invention also enables to be applied to a video of ITU H.26x having only I and P type frames.

In FIG. 4, the P-frames accessed for the method execution are shown darker than the I and B frames.

[Method of Determining a Macro-Block Type in P-Frame]

An encoder of MPEG or H.26x encodes several to scores frames per second by receiving a video signal.

The respective frames are encoded into block units called macro blocks. And, when coding one macro-block in the P type frame, a most similar block is marked as a matching block by predicting motions from adjacent blocks in the very previous I or P-frame and a difference in a space between the corresponding block and other block used for the prediction is encoded into a motion vector (forward prediction or motion prediction).

In this case, the corresponding block is intra-coded when there is no similar block within a predetermined range.

Figure 5:
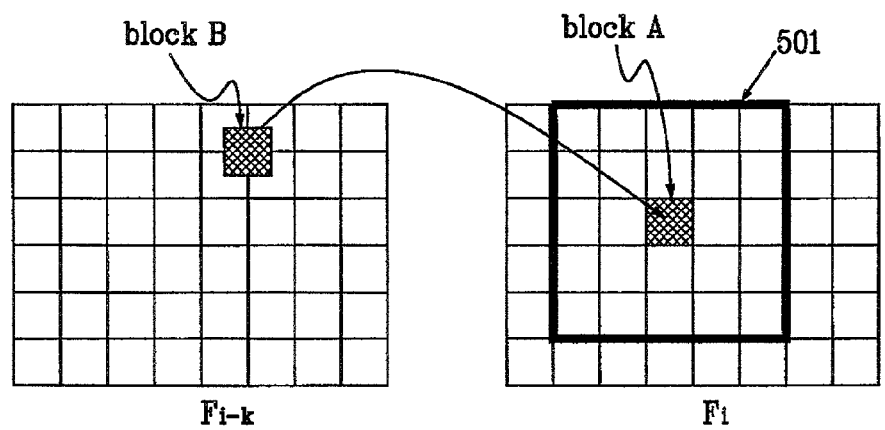
FIG. 5 shows concepts of motion vector and macro-block.

FIG. 5 shows concepts of motion prediction and macro-block in an MPEG or H.26x video compression method.

In a frame Fi(P type frame), a rectangle represented by a bold line indicates a range(generally denoted by a fcode in MPEG) to be searched for the motion prediction, i.e. a search window 501, when encoding a macro-block A.

A video compression standard such as MPEG finds a block nearest to the corresponding block by half pixel unit within the search range for the motion prediction.

It is assumed that a reference frame for the motion prediction and compensation of the frame Fi is Fi-k (I or P type frame) and that a block the closest to the block A within the search range for the motion prediction and compensation of the Fi (P type frame) is a block B.

In this case, if the difference between the blocks B and A remains within a predetermined level, the corresponding macro-block (block A) is marked as a block coded by the motion prediction, a vector difference between the blocks B and A is coded into a motion vector, and the difference is coded as well.

Otherwise, when the difference between the blocks B and A exceeds the predetermined level, the corresponding macro-block (block A) is intra-coded. The present invention proposes a method detecting a wipe and special effect on the basis of the following properties of macro blocks in a P-frame.

Two macro-block types of intra-coded macro blocks and motion prediction macro blocks exist in a P-frame.

When coding the corresponding macro-block in a P-frame, motion prediction is used provided that a similar macro-block exists within a predetermined range of X and Y axes in the very previous I or P type frame. Otherwise, the corresponding macro-block is intra-coded.

[Characteristic of Macro-block Type Distribution on a P type Frame in a Wipe Interval: ICMBB]

Figure 6:
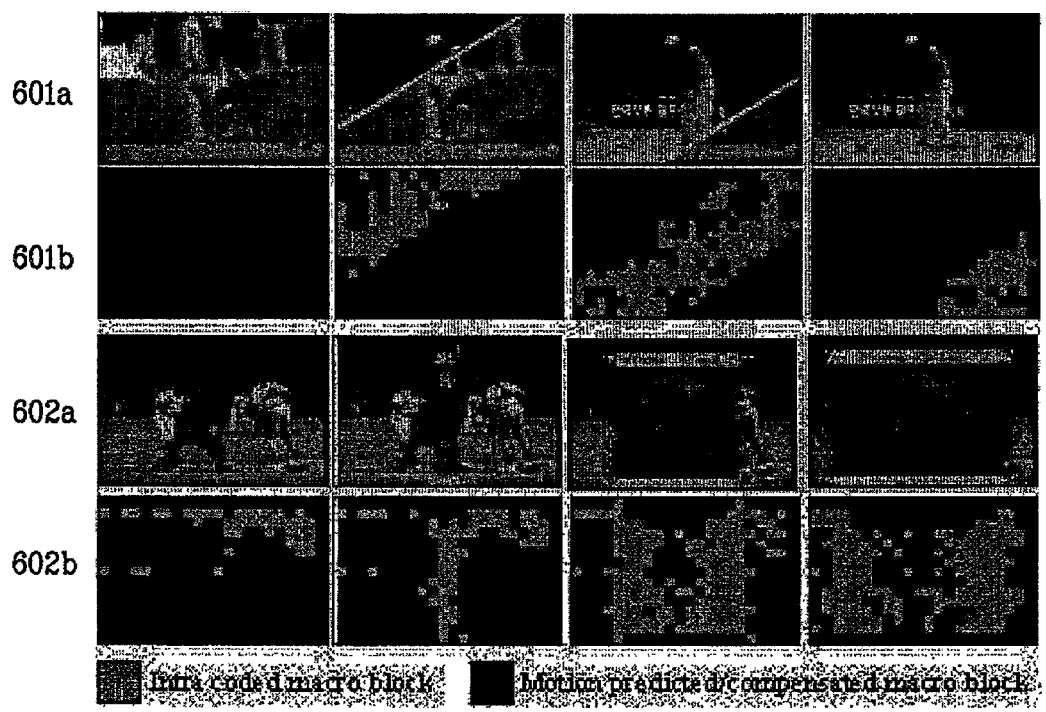
FIG. 6 shows examples of macro-block type distribution in a wipe region.

FIG. 6 shows pictures of the corresponding spatio-temporal macro-block distribution of a P type frame in an interval where shot transition by wipe occurs.

A numeral 601a shows that wipe is generated from a left top of a screen to a right bottom diagonally, and a numeral 602a shows a wipe, which is split from a center of a screen vertically. A numeral 601b indicates the distribution of intra-coded macro blocks in 601a, and a numeral 602b represents the distribution of intra-coded macro blocks in 602a.

Most of the macro blocks corresponding to a new entering area are intra-coded while the rest are coded by motion prediction, which occurs commonly in shot transition using two wipes.

Therefore, intra-coded blocks in wipes and special effects are spatially concentrated on one area as shown in 601b and 602b. When wipe is going on, intra coded macro-block bands (ICMBB) show up in general and the corresponding ICMBB move to a specific direction. Thus, all the ICMBB between a wipe-initiating frame and a wipe-terminating frame are joined together spatially so as to occupy most areas of an image.

[Characteristic of Macro-block Type Distribution on a P type Frame in a Special Effect Interval]

Figure 7:
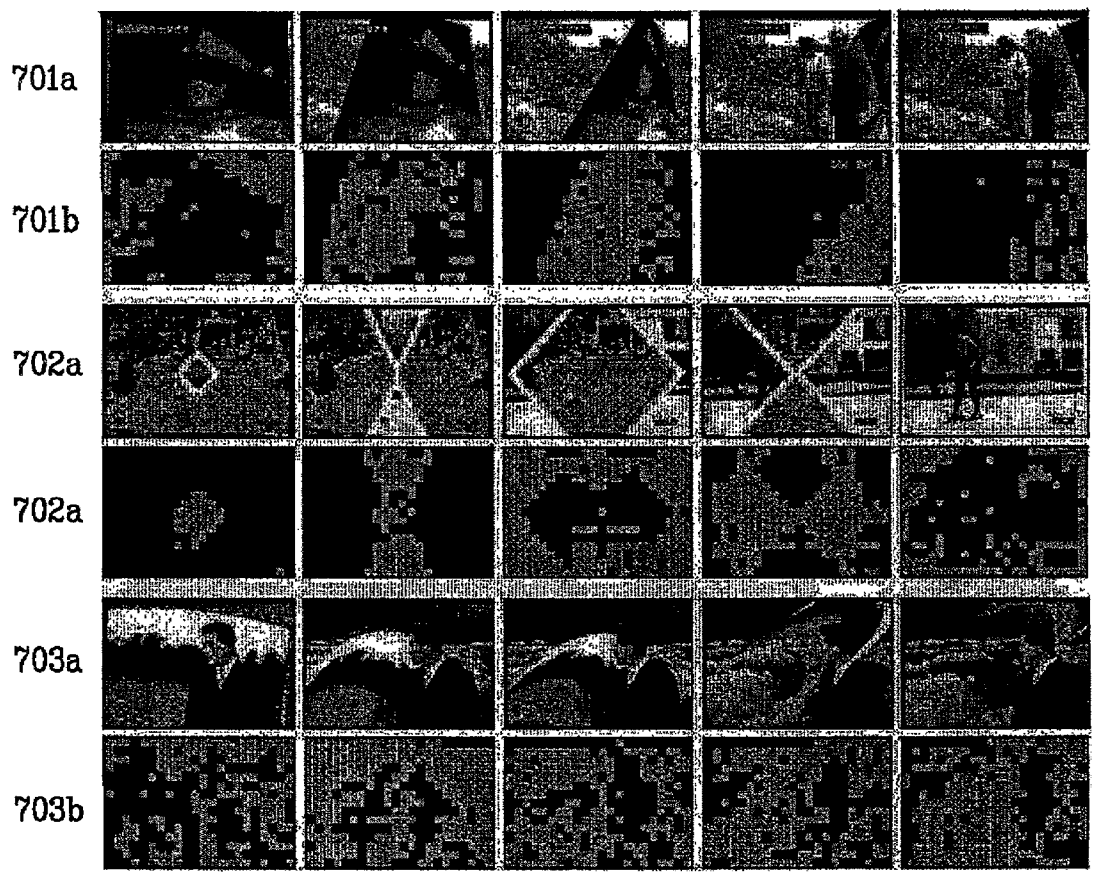
FIG. 7 shows examples of shot transition by special effect and distribution characteristics of macro block.

FIG. 7 shows the corresponding spatio-temporal macro-block distribution of a P type frame in an interval where shot transition by special effect occurs.

A special effect in 701a is very similar to a general diagonal wipe, of which macro-block distribution characteristic is illustrated in 701b. Most macro blocks corresponding to a newly appearing area are intra-encoded as shown in 702a, thereby showing the distribution characteristic in 702b.

Most specific macro blocks by a special effect in 703a are intra-coded, thereby showing the distribution characteristic on 703b.

Namely, various type special effects show macro-block type distribution of which standardization is difficult. Failing to occupy entire areas in a shot transition interval using this special effect, macro blocks intra-coded in the respective frames come into occupying most areas by putting spatially together the areas in the temporally-consecutive P type frames. Thus, most macro blocks over several consecutive frames are intra-coded.

Therefore, the present invention proposes three kinds of wipe and special effect detection methods, which are a method using characteristics of ICMBB (first embodiment), a temporal axis projection method of intra-coded macro blocks (second embodiment), and a threshold value application method of intra-coded blocks (third embodiment).

As shown in FIG. 6 and FIG. 7, the spatio-temporal distribution characteristics of intra-coded macro blocks when shot transition by wipe or special effect occurs are represented as follows.

In a P-frame, intra-coded macro blocks are concentrated to form into clusters which appears continuously in accordance with a P-frame sequence (time progressing).

In a P-frame, intra-coded macro blocks gathers to form into clusters (ICMBB) which may move to a specific direction in accordance with a P-frame sequence (time progressing).

ICMBs appear massively in an entire P-frame when putting spatially together ICMBs in accordance with a P-frame sequence (time progressing) and the number (ratio) of ICMBs in the P-frame is very high.

ICMBB show up consecutively over predetermined frames continuously.

Accordingly, a method using ICMBB characteristics (first embodiment) in a wipe and special effect detection method according to the present invention detects ICMBB as 701a and 701b in FIG. 7 and is a wipe and special effect detection method using the continuous characteristics of ICMBB.

And, a temporal axis projection method of intra-coded macro blocks(second embodiment) in a wipe and special effect detection method according to the present invention is a method for detecting special effects failing to be detected by ICMBB projected on a specific axis, as shown in 702a and 702b, in which entire intra-coded blocks are concentrated on most specific areas of the respective P-frames in the consecutive P-frames and intra-coded macro blocks projected on a temporal axis come into occupying most areas.

A threshold value application method of intra-coded blocks (third embodiment), as shown in 703a and 703b, uses the characteristic that most macro blocks show up continuously over a predetermined time in P-frames to be intra-coded. Such a characteristic only appears in an interval where wipes and other special effects occur.

A wipe and special effect detection method according to the present invention enables to introduce the above-mentioned three sub-methods together and is characterized in introducing one or two of the three sub-methods selectively.

Introducing all the sub-methods simultaneously, the present invention may be carried out under the condition that the respective sub-method s are satisfied at the same time. And, the present invention also enables to construct a total method of shot transition detection by wipe or special effect with the condition of satisfying just one of the respective sub-methods.

[First Embodiment]

A first embodiment of the present invention according to a first characteristic is a wipe and special effect detection method including the steps of detecting an area on which intra-coded macro blocks are concentrated by projecting the intra-coded macro blocks of a compressed domain to a predetermined direction in a P-frame of the compressed domain of a video stream based on a picture difference between frames, and judging whether shot transition by wipe and special effect is carried out by applying a spatio-temporal limiting condition to consecutive P-frames having the area on which the detected macro blocks are concentrated. And, the present invention is carried out by the steps of a preprocessing, an intra macro-block projection, an intra-coded macro-block projection histogram binarization, a post processing, and a time limiting condition application in order.

In this case, the preprocessing and post processing steps are optional, which is applicable to second and third embodiments of the present invention as well.

In the present invention, the frame including the intra-coded macro blocks is a P-frame. The p-frame may be a frame constructed just with a forward prediction in MPEG or H.26x and the intra-coded macro blocks.

In the preprocessing step of the present invention, when the area on which the intra-coded macro blocks are concentrated is detected, macro blocks adjacent to the intra-coded macro blocks are regarded as intra-coded blocks.

In the preprocessing step of the present invention, when the macro blocks adjacent to the intra-coded macro blocks are regarded as the intra-coded macro blocks, the case that motion prediction blocks, of which motion vectors are larger than a threshold value and which are adjacent to the intra-coded macro blocks, is regarded as intra-coded macro blocks.

In the present invention, the detection of the area on which the intra-coded macro blocks are concentrated is carried out by finding a projection histogram by projecting the intra-coded macro blocks to at least one direction in the compressed domain (space) by taking the intra-coded macro blocks as references and by calculating a ratio of the intra-coded macro blocks projected from the projection histogram to the projecting direction.

In the present invention, the detection of the area on which the intra-coded macro blocks are concentrated is carried out by finding a projection histogram by projecting the intra-coded macro blocks to at least one direction in the compressed domain (space) by taking the intra-coded macro blocks as references and by calculating a projection histogram binary value by binarizing the projection histogram.

In the post processing of the present invention, outliers or holes are removed from the binarized projection histogram.

With the spatio-temporal limiting condition of the present invention, when a running time between initial and end frames (b) and (e) in which the areas on which the intra-coded macro blocks are concentrated show up intensively exceeds a threshold value, the interval [b,e] is judged as a shot transition interval by the wipe or special effect.

With the spatio-temporal limiting condition of the present invention, when a maximum area, on which the intra-coded macro blocks are concentrated intensively, are projected on a temporal axis in a frame sequence [b,e] where the areas on which the intra-coded macro blocks are concentrated show up intensively, the interval [b,e] is judged as a shot transition interval by the wipe or special effect provided that the projected values of a count or ratio occupying the entire frame areas exceeds a threshold value.

In the present invention, the area on which the intra-coded macro blocks are concentrated is projected on the temporal axis under the OR condition for the same index (same location in a spatial coordinate).

With the spatio-temporal limiting condition of the present invention, when a maximum area, on which the intra-coded macro blocks are concentrated intensively, moves to a fixed direction on a continuous frame sequence, the interval [b,e] is judged as a shot transition interval by the wipe or special effect.

Regarding the movement of the area on which the intra-coded macro blocks are concentrated according to the present invention, a center point of the area on which the intra-coded macro blocks are concentrated is chosen and the movement of the center point on the temporal axis is regarded as the movement of the area on which the intra-coded macro blocks are concentrated.

[Preprocessing Step]

In a stream such as MPEG, image coding is performed in a unit of macro-block and motion vectors are used for improving coding efficiency.

In the present invention, the preprocessing step is used for detecting wipe and special effect by regarding the macro blocks, of which motion vectors are very large (exceed a threshold value) and which are adjacent to the intra-coded macro blocks, as intra-coded blocks.

This [Preprocessing Step] is characterized in being done before the execution of the respective methods of the second and third embodiments. In the [Preprocessing Step], macro blocks adjacent to the intra-coded macro blocks are selected. The macro blocks to be selected mean the macro blocks, of which motion vectors are larger than an established threshold value, in the intra-coded blocks and 4 or 8-directionally adjacent motion macro blocks.

Figure 8:
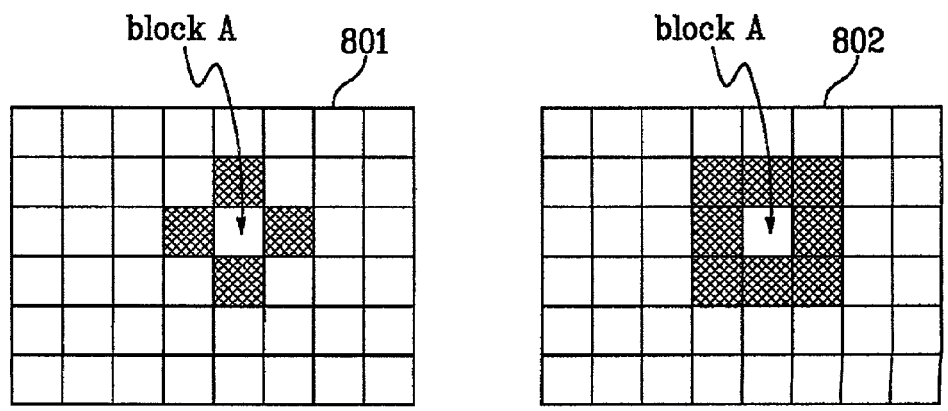
FIG. 8 shows concepts of a 4-directional connection macro-block and an 8-directional connection macro-block.
Figure 9:
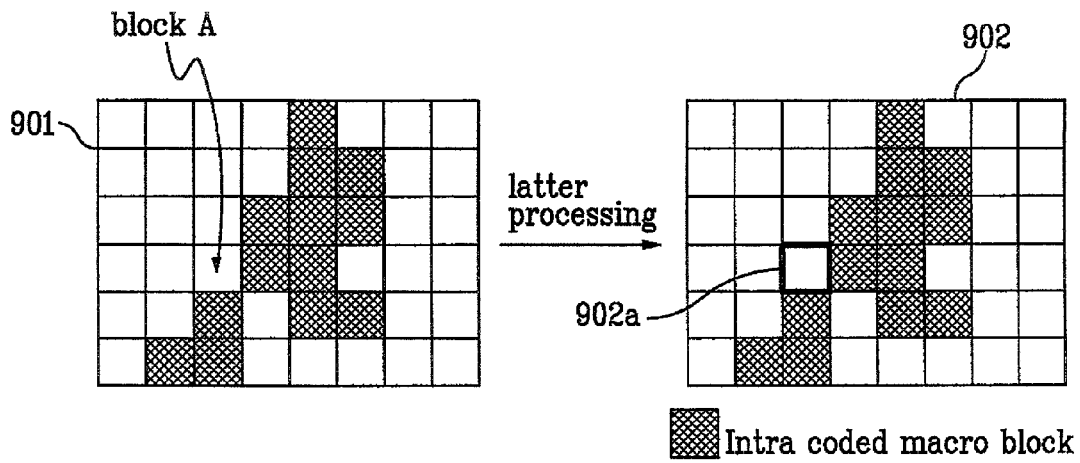
FIG. 9 shows an example of a preprocessing according to the present invention.

FIG. 8 shows a specific block and macro blocks adjacent to the specific block to the 4 and 8 directions, and FIG. 9 explains a process of carrying out image transition from an input macro-block image to an image passing through [a preprocessing step].

In FIG. 8, numerals 801 and 802 are images of macro-block levels, wherein blocks adjacent 4-directionally to a block A in 801 are represented by a gray color and blocks adjacent to 8-directionally to a block A are also represented by a gray color.

In FIG. 9, intra-coded blocks are treated with a gray color. A numeral 901 represents a macro-block image before a preprocessing. In 901, the block A of which motion vector is very large is a macro-block adjacent to an intra-coded macro-block. Such a macro-block is changed into a form in 902 by the [preprocessing step].

Namely, the block A in an image of a macro-block level is a block adjacent to the intra-coded block. When a motion vector of the block A exceeds a threshold value, the block A is regarded as an intra-coded macro-block. Thus, in an image 902 at a macro-block level after the preprocessing step, the block A is regarded as an intra-coded macro-block 902a.

[Intra Macro-Block Projection Step in the First Embodiment]

Figure 10:
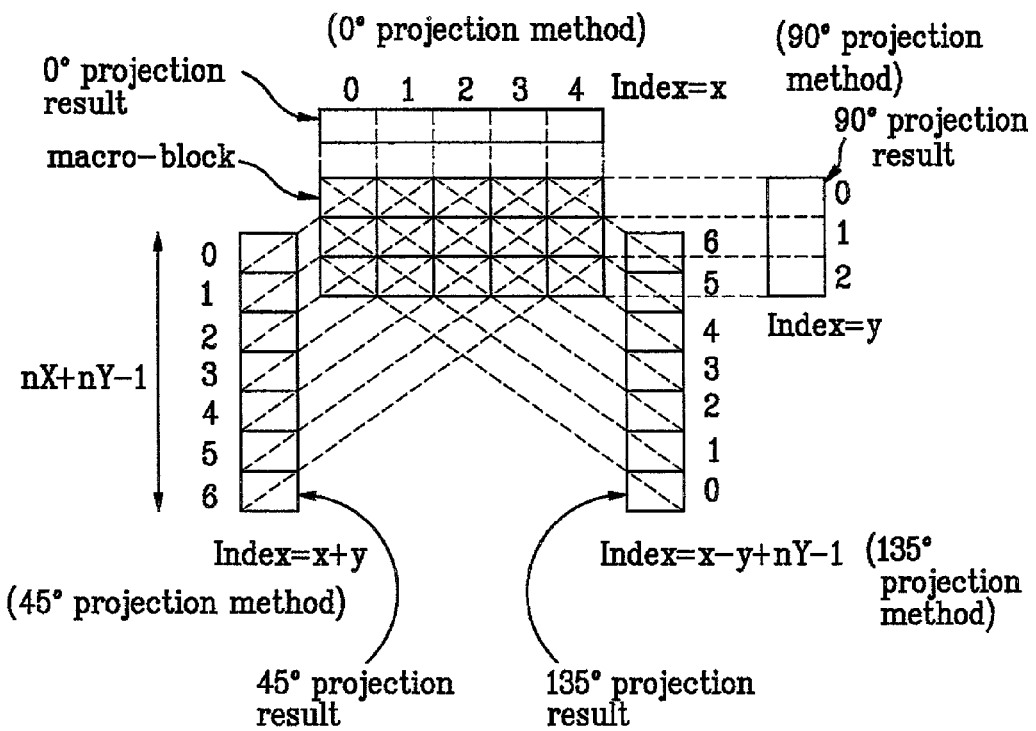
FIG. 10 shows a 4-directional projection method of macro-block type according to the present invention.

FIG. 10 shows a 4-directional projection method of macro-block type so as to detect wipes of vertical/horizontal/diagonal directions widely used as wipes.

Macro-block projection histograms to the four directions to be projected are required respectively. And, the intra-coded macro-block projection histograms have the data structures in which a ratio of intra-coded blocks in the macro blocks projected on the corresponding directions.

An index, which is the bin number, of a histogram varies in accordance with a reference location when a macro-block is projected, which is determined by the X-axis and Y-axis indexes.

When nX macro blocks exist to an X-axis direction and nY macro blocks exist to a Y-axis direction, as shown in FIG. 10, they are projected on total nX bins when projected to a vertical direction of the X-axis (90° projection), total nY bins when projected to a vertical direction of the Y-axis (0° projection), and total nX+nY−1 bins when projected to a diagonal direction (45° or 135° projection). It is able to represent the respective macro blocks by the X-axis and Y-axis directional indexes.

If a macro-block corresponding to an xth of the X-axis and a Yth of the Y-axis is M(x,y) wherein $0 \leq x \leq nX-1$ and $0 \leq y \leq nY-1$, M(x,y) is projected 4-directionally on the corresponding bins as follows.

| projection to a vertical direction of X-axis(90° projection):index = x |  |
|---|---|
| projection to a vertical direction of Y-axis(0° projection):index = y |  |
| 45° projection | index = x + y |
| 135° projection | index = x − y + nY − 1 |

If an index of each of the intra-coded macro-block projection histogram is I, a count of projected macro blocks (CPMB) to be projected on the respective bins of the intra-coded macro-block histogram by direction of projection is as follows.

| | |
|---|---|
| projection to a vertical direction of X-axis(90° projection):CPMB = nX | |
| projection to a vertical direction of Y-axis(0° projection):CPMB = nY | |
| 45° projection | CPMB = Min(i + 1,nX + nY − 1 − i,nX,nY) |
| 135° projection | CPMB = Min(i + 1,nX + nY − 1 − i,nX,nY) |

Min(A,B,C,D) means the minimum value in A,B,C, and D.

In an algorithm constructing an intra-coded macro-block projection histogram, a value corresponding to an index of the histogram is increased by scanning all the macro blocks (M(x,y), (0≦x≦nX−1, 0≦y≦nY−1)) and finding the respective indexes projected to the 4-directions if the corresponding macro-block is an intra-coded macro-block.

If the macro-block scan is carried out once, the respective bins of the respective histograms are recorded by the count of the intra-coded macro blocks to the corresponding directions.

As mentioned in the above description, the count of the macro blocks to be projected on the bins of the respective intra-coded macro-block histogram. Thus, a ratio of the intra-coded blocks appearing to the corresponding projected direction is attained by the standardization of dividing the respective bin values by the count of projected macro blocks (CPMB) of the intra-coded macro-block projection histogram.

Figure 11:
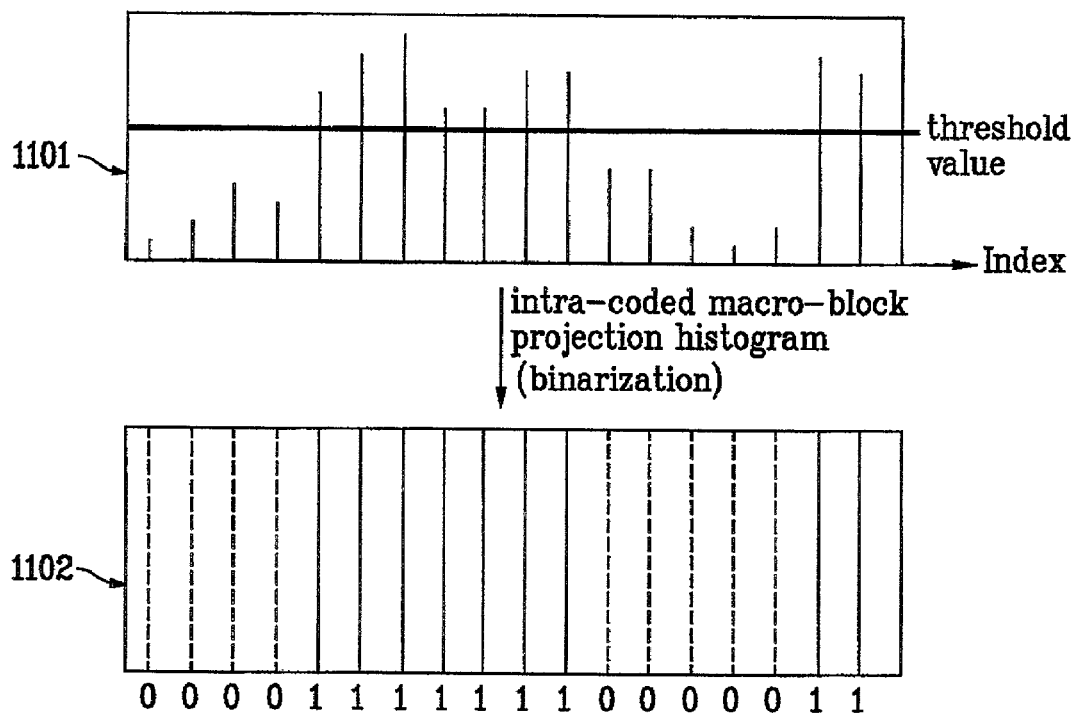
FIG. 11 shows binarization of an intra macro-block projection histogram according to the present invention.

FIG. 11 shows an example (1101) of an intra-coded macro-block projection histogram.

[Intra-coded Macro-Block Projection Histogram Binarization Step in First Embodiment]

If the bins of which specific bin values exceed a predetermined threshold value are set by 1 and the rest are set by 0 after the [Intra Macro-Block Projection Step], information about the area on which intra-coded blocks are concentrated is obtained.

FIG. 11 explains a method of applying a threshold value to the intra macro-block projection histogram (1101).

A binarized intra macro-block projection histogram (1102) is obtained by applying a threshold value to the intra macro-block projection histogram (1101) attained by the [preprocessing step] and by setting the bins exceeding the threshold value by 1 and the rest by 0.

[Post processing Step in First Embodiment]

A part on which the intra-coded macro-block projection histograms are concentrated is detected by the foregoing intra-coded macro-block projection histogram binarization step as well.

Yet, the [post processing step] may be added for the precise detection of the part on which the intra-coded macro-block projection histograms are concentrated. The [post processing step] includes the steps of removing outliers and removing holes.

It is able to carry out either the step of removing outliers or the other step of removing holes in the [post processing step]. Otherwise, it is also able to use both steps.

When both steps are applied, the order of execution is random.

Figure 12:
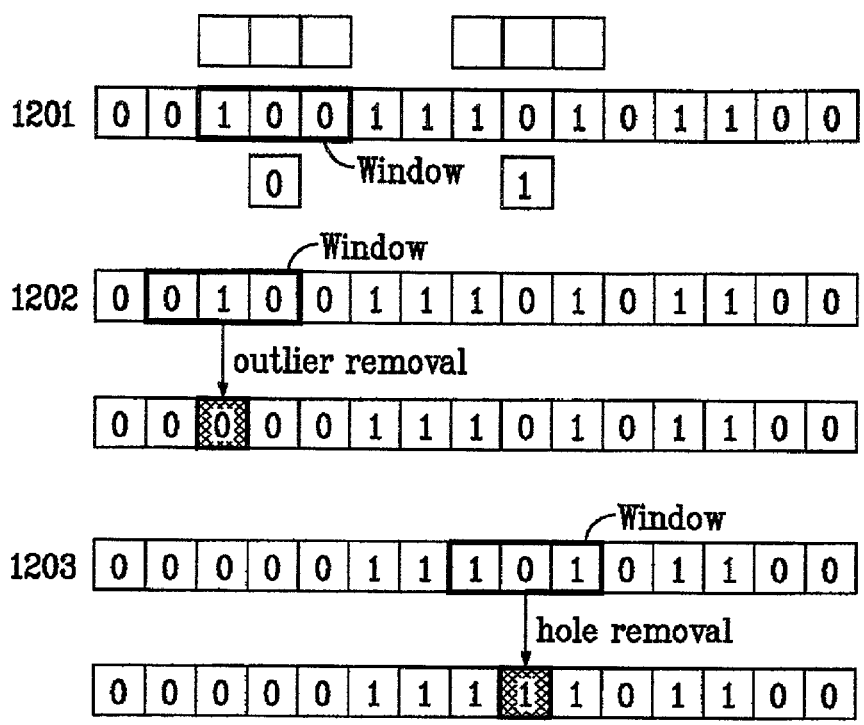
FIG. 12 shows an example of a post processing according to the present invention.

FIG. 12 shows an example of the [Post processing Step].

First outliers are removed. Then, holes are removed.

The manners of removing the outliers and holes are various. In FIG. 12, a manner of selecting most frequently used value using a window of which size is 3 is taken.

In the drawing, numerals 1201, 1202, and 1203 show manners of using such a window, removing outliers using the window, and removing holes, respectively.

The outlier, of which window center is '1' and its left and right are '0', is removed by being set by '0' when a window of which size is 3 is applied. The hole, of which window center is '0' and its left and right are '1', is removed by being set by '1' when a window of which size is 3 is applied.

[Time Limiting Condition Application Step in First Embodiment]

The intra-coded macro-block projection histogram after the [step of applying a threshold value to the intra-coded macro-block projection histogram] in FIG. 11 and/or the [post processing step] in FIG. 12 is used as direct data for detecting wipes or special effects.

Figure 13:
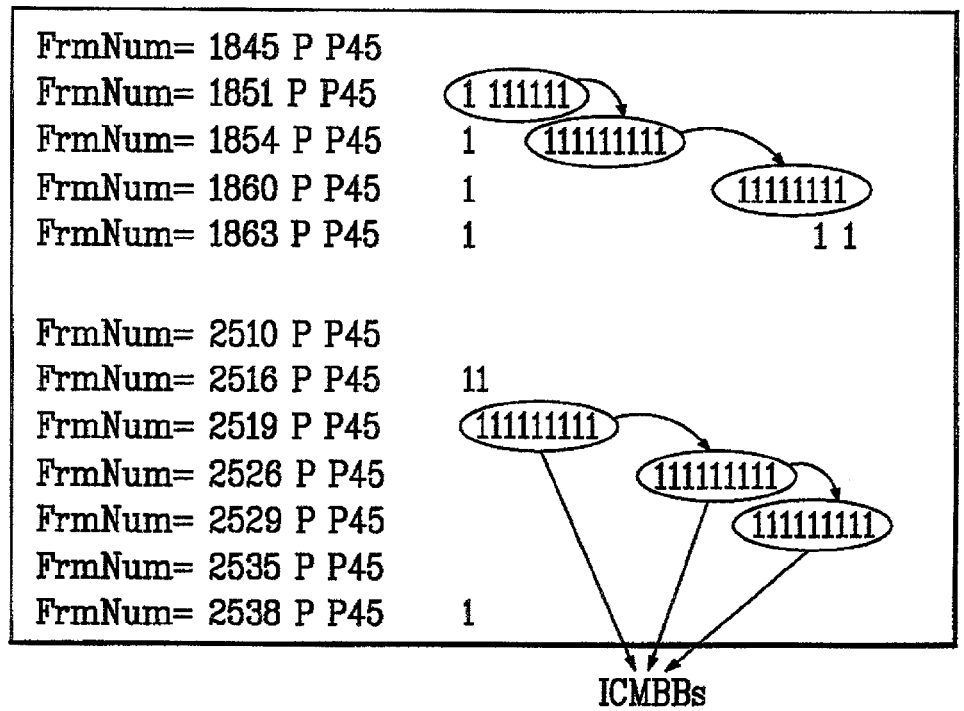
FIG. 13 shows an example of wipe detection using spatio-temporal distribution of ICMBB according to the present invention.

FIG. 13 shows forms of intra-coded macro-block bands (ICMBB) appearing in an wipe area and transfers in spatial domain of ICMBB with frame numbers (FrmNum).

ICMBB designate the parts on which the macro blocks intra-coded to the corresponding projection directions are concentrated. Generally, such ICMBB appear in wipes and special effects, which is used by the present invention for detecting the corresponding intervals when ICMBB appear continuously over a period of time [Time Limiting Condition Application Step].

In FIG. 13, ICMBB for a couple of wipe patterns proceeding to 45° are illustrated.

Assuming that a frame number, from which a sequence where a specific ICMBB appears initiates, is 'b' and that a frame number where the sequence ends is 'e', [b,e] is selected as a candidate interval in which shot transition by a wipe or a special effect occurs.

The present invention judges the interval [b,e] where ICMBB show up as the interval where the special effect occurs.

Otherwise, the present invention judges the corresponding interval [b,e] as an interval in which shot transition by a wipe or a special effect occurs if a characteristic that intra-coded blocks occupy an entire area by being projected on a temporal axis is satisfied.

Figure 14:
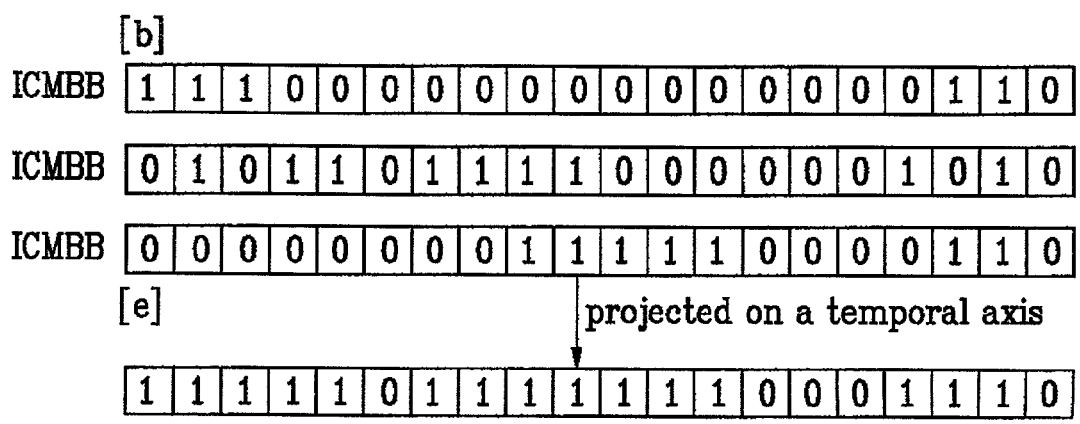
FIG. 14 shows a temporal axis projection method of ICMBB according to the present invention.

FIG. 14 shows a method of projecting ICMBB in an interval on a temporal axis according to the present invention.

Referring to FIG. 14, projecting ICMBB on a temporal axis passes through a step of setting bins, which have been detected at least once by a P-frame in the corresponding interval, by '1'.

In order to enhance the precision of the detection, the present algorithm introduces a method of judging a shot transition interval by wipe or special effect only when ICMBB move to a fixed direction in the interval [b,e]. In detail, the algorithm may be constructed with the steps of searching a central point of ICMBB and detecting the settlement of the moving direction of the central point in the temporal axis.

[Second Embodiment]

A second embodiment of the present invention according to a second characteristic is a wipe and special effect detection method including the steps of detecting a sequence of P-frames on which intra-coded macro blocks intra-coded in a compressed domain of a video stream based on a picture difference between frames, projecting maximum connection components of the intra-coded macro blocks in the corresponding sequence interval of the detected P-frames on a temporal axis, and judging whether shot transition by wipe and special effect is carried out by comparing a count of the macro blocks intra-coded in the projected image to a predetermined threshold value.

In the present invention, the frame including the intra-coded macro blocks is a P-frame. The p-frame may be a frame constructed just with forward prediction in MPEG or H.26x and the intra-coded macro blocks.

In the present invention, when the area on which the intra-coded macro blocks are concentrated is detected, macro blocks adjacent to the intra-coded macro blocks are regarded as intra-coded blocks, which is the same of the first embodiment.

In the present invention, the detection of the frame sequence [b,e] is obtained by applying intensiveness of the macro blocks intra-coded in all the P-frames in the interval [b,e]. And, the intensiveness is judged by a ratio between a count of macro blocks belonging to the maximum connection component of the intra-coded macro blocks and a count of the entire intra-coded macro blocks.

In the present invention, one of the intra-coded macro-block connection components, of which count of the intra-coded macro blocks is maximum is regarded as the maximum connection component.

In the present invention, when the connection components of the intra-coded macro blocks are projected on the temporal axis, macro blocks corresponding to the maximum connection components of the intra-coded macro blocks in the respective frames in the interval [b,e] are projected on the image coordinate space used for the corresponding macro blocks, thereby providing a projected image.

In the present invention, the projected image is projected under the OR condition for the intra-coded macro blocks corresponding to the projection resource in the interval [b,e], i.e. the corresponding coordinates of the respective P-frames having the maximum connection components of the intra-coded macro blocks.

With the spatio-temporal limiting condition of the present invention, when a count of the intra-coded macro blocks in a macro-block level image obtained by the projection of the maximum connection components in the entire P-frames within the frame sequence [b,e] exceeds a threshold value, the interval [b,e] is judged as a shot transition interval by the wipe or special effect.

A method according to a second embodiment of the present invention is "a method of projecting intra-coded macro blocks on a temporal axis", in which a sequence of P type frames concentrated on a specific area is detected.

There are various ways of judging that intra-coded macro blocks are concentrated on a specific area, of which simple way is as follows.

(a) Obtain a count n of macro blocks in a P-frame.
(b) Obtain a connection component of intra-coded macro blocks in a P-frame.
(c) Assume that a size of a connection component of the intra-coded macro-block occupying a maximum area is k.
(d) Compare k/n to a threshold value Th.
(e) Include the frame in a candidate sequence if k/n exceeds the threshold value Th after the comparison.

The above simple way means that information about the cluster of the macro blocks intra-coded in the P-frame.

Namely, when a total count of blocks intra-coded in a P-frame is n, a ratio k/n of <a size k (=a count of ICMB included in the largest clustered ICMBB) of a connection component occupying the largest area (a count of ICMB is taken as a reference) in the connection components of the blocks intra-coded in the corresponding P-frame> over <macro blocks in the entire P-frame> is obtained. If the ratio is higher than the predetermined threshold value Th, it is judged that a largely clustered intra-coded macro-block band exists in the P-frame.

Figure 15:
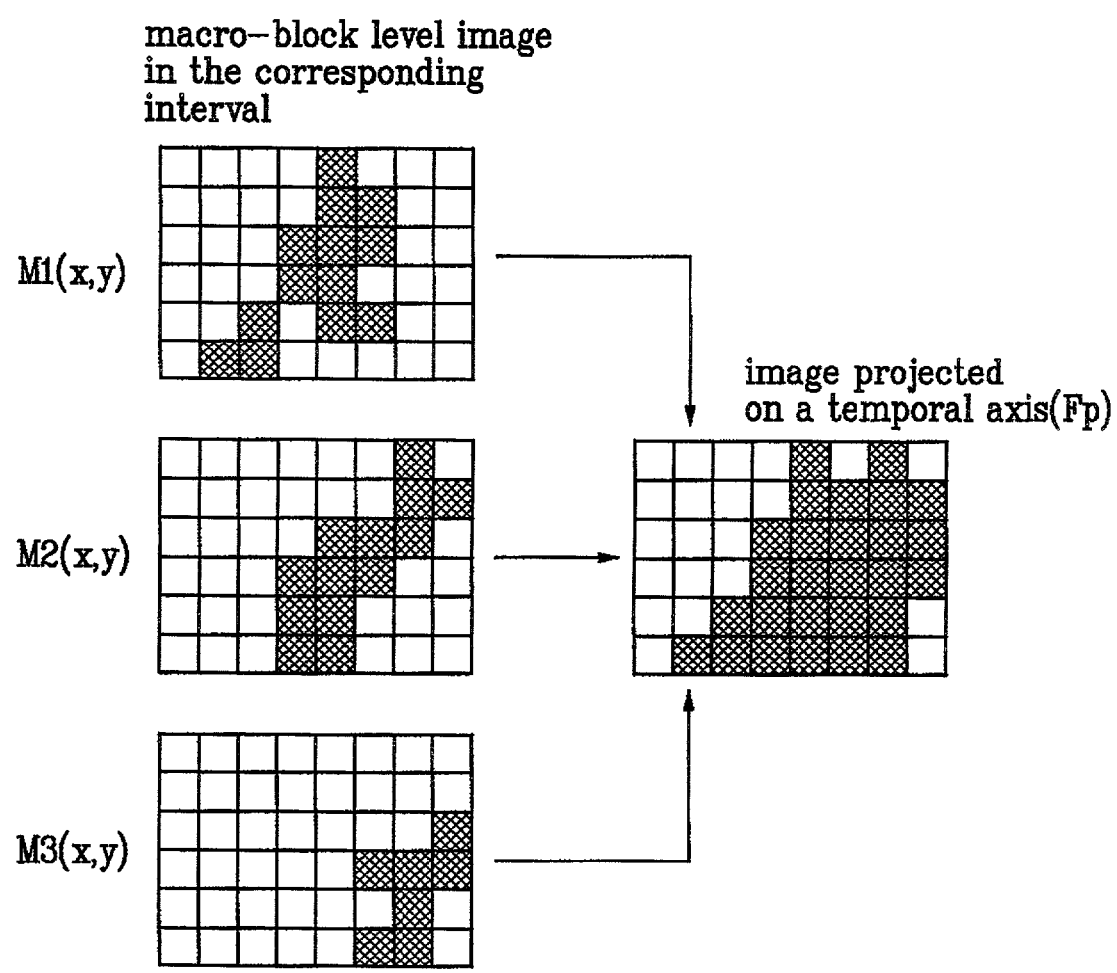
FIG. 15 shows a temporal axis projection method of an intra-coded macro-block.

FIG. 15 explains a method of constructing an image obtained by projecting maximum connection components of intra-coded blocks in consecutive P-frames on a temporal axis.

A method of constructing an image obtained by projecting maximum connection components of maximum intra-coded blocks in P-frames within an interval [b,e] on a temporal axis means that intra-coding is obtained by projecting macro blocks, which correspond to block coordinates in the maximum connection components of the maximum intra-coded macro blocks in the respective P-frames within an interval, on the corresponding coordinates of a projected image.

When an image projected on the temporal axis is Fp, "a method of projecting intra-coded macro blocks on a temporal axis" is characterized in that a corresponding candidate sequence is the interval where wipe or special effect occurs if a count of the intra-coded blocks in Fp exceeds a specific threshold value.

[Third Embodiment]

A third embodiment of the present invention according to a third characteristic is a wipe and special effect detection method including the steps of detecting a sequence of consecutive P-frames in each of which count of macro blocks intra-coded in a compressed domain of a video stream based on a picture difference between frames exceeds a predetermined threshold value, and judging whether shot transition by wipe and special effect is carried out from whether a running time in a sequence corresponding interval of the detected P-frames continues over a predetermined time or not. And, the third embodiment of the present invention is related to a method of applying a threshold value to intra-coded macro blocks.

In the present invention, the frame including the intra-coded macro blocks is a P-frame. And, the p-frame may be a frame constructed just with forward prediction in MPEG or H.26x and the intra-coded macro blocks.

In the present invention, when the area on which the intra-coded macro blocks are concentrated is detected, macro blocks adjacent to the intra-coded macro blocks are regarded as intra-coded blocks, which is the same of the first and second embodiments.

A method according to a third embodiment of the present invention is "a method of applying a threshold value to intra-coded macro blocks", in which most macro blocks are intra-coded in a P-frame by a specific special effect and such P-frames show up consecutively over a period of time.

For instance, the case of 703 in FIG. 3 is a good example.

For the third method, a method of selecting P-frames to be included in a sequence of the P-frames is represented as follows.

(a) Obtain a count n of intra-coded macro blocks in a P-frame.
(b) Compare a count n of intra-coded macro blocks in a P-frame to a threshold value TH.
(c) Select a sequence [b,e] of P-frames, which satisfies the condition that the count n of the intra-coded macro blocks exceeds the threshold value TH, as a candidate interval.

When a sequence of P-frames satisfying the above condition is [b,e], the corresponding interval [b,e] is judged as a shot transition interval by the wipe or special effect if a running time of an interval [b,e] exceeds a predetermined time.

Generally, most shot segmentation methods regard the case of intra-coding most macro blocks in a P-frame as occurrence of abrupt shot transition (hard cut). The method according to the third embodiment of the present invention uses a general characteristic that hard-cuts hardly occur consecutively within several seconds.

Methods introduced by the first to third embodiments of the present invention are summarized as follows.

The present invention, when shot transition is produced by wipe or special effect, makes use of a characteristic that intra-coded blocks in the consecutive P type frames appear intensively in a predetermined area or most macro blocks are intra-coded in the consecutive P type frames.

As all of the processing is executed at a macro-block level, performing speed of methods according to the present invention is very fast.

False alarms detected in the conventional shot segmentation method are caused by intervals where the object/camera motion occurs.

In such intervals where the object/camera motion occurs, most macro blocks uses motion prediction.

Wipe and special effect detection methods according to the related arts fail to use macro-block type information or motion vectors, thereby causing a high ratio of false alarms by taking camera/object motion as shot transition intervals by wipe or special effect.

Yet, the present invention considers macro-block type information and motion vectors, thereby showing a very low ratio of false alarms due to camera/object motion.

The present invention uses a characteristic that most macro blocks in an interval having camera/object motion are coded by motion prediction in a video encoding method of MPEG or H.26x, thereby showing a very low ratio of false alarms due to camera/object motion.

Shot segmentation and shot clustering techniques are elementary techniques for non-linear video browsing and searching. And, the shot segmentation technique is essential for the shot clustering.

Different from a wipe transition detection method of the related art using pixel unit processing in a not-compressed domain, color histograms, or brightness transition, the present invention is a wipe and special effect detection method using spatio-temporal distribution characteristics of macro-block types in a P-frame which uses forward motion prediction only in a compressed domain.

Different from the wipe detection method of the related art, the present invention enables to detect shot transition intervals by various special effects.

The method of detecting wipe and special effect detection according to the present invention performs its processing in a compressed domain, thereby showing the fastest method processing speed as well as excellent performance.

As most methods of determining macro-block types are similar to that of detecting camera/object motion, methods according to the present invention are more robust against fast camera motion or large motion information of large objects than any other method of the related art.

Different from shot transition by hard-cut, shot transition be wipe or shot transition contains video editor's special intention such as scene change mostly, thereby enabling to be used as important inputs for shot clustering and the like.

Moreover, methods according to the present invention makes use of the basic properties used in a basic shot segmentation method so as to be united with the conventional shot segmentation method as well as be used as a basic input for shot clustering.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for detecting a wipe and special effect of a video stream comprising consecutive frames having spatio-temporal relations, wherein the frames are constructed in a unit of macroblocks and wherein the macroblocks include intra-coded macroblocks, the method comprising:

detecting an area on which intra-coded macroblocks are concentrated in a frame including macroblocks; and judging whether shot transition by wipe and special effect occurs by applying a spatio-temporal limiting condition to only the consecutive frames having the area on which the detected intra-coded macroblocks are concentrated, wherein the detection of the area on which the intra-coded macroblocks are concentrated is carried out by finding a projection histogram by projecting the intra-coded macroblocks in at least one direction in the compressed domain (space) by taking the intra-coded macroblocks as references and by calculating a ratio of the intra-coded macroblocks projected from the projection histogram in the projecting direction.

2. The method of claim 1, wherein the frame including the intra-coded macroblocks is a P-frame constructed by forward prediction in MPEG or H.26x and the intra-coded macroblocks.

3. The method of claim 1, wherein macroblocks adjacent to the intra-coded macroblocks are regarded as intra-coded macroblocks when the area on which the intra-coded macroblocks are concentrated is detected.

4. The method of claim 3, wherein a case that motion prediction blocks, of which motion vectors are larger than a threshold value and which are adjacent to the intra-coded macroblocks, is regarded as intra-coded macroblocks when the macroblocks adjacent to the intra-coded macroblocks are regarded as the intra-coded macroblocks.

5. The method of claim 3, wherein the adjacent macroblocks are determined by the macroblocks located to be adjacent to 4 directions of top, bottom, right, and left or 8 directions of top, bottom, right, left, and four corners.

6. The method of claim 1, wherein the projecting directions by taking the intra-coded macroblocks as references are 0°, 45°, 90° and 135° in the corresponding compressed domain.

7. The method of claim 1, wherein an interval is judged as a shot transition interval by the wipe or special effect applying the spatio-temporal limiting condition, provided that a running time between initial frame (b) and end frame (e) of the sequence that the areas on which the intra-coded macroblocks are concentrated consecutively appear exceeds a threshold value.

8. The method of claim 1, wherein an interval is judged as a shot transition interval by the wipe or special effect applying the spatio-temporal limiting condition, provided that the projected values of a count or ratio occupying the entire frame areas exceeds a threshold value, when a maximum area, on which the intra-coded macroblocks are concentrated intensively, is projected on a temporal axis in a frame sequence where the areas on which the intra-coded macroblocks are concentrated show up intensively.

9. The method of claim 8, wherein the area on which the intra-coded macroblocks are concentrated is projected on the temporal axis under the OR condition for the same index (same location in a space).

10. The method of claim 1, wherein an interval is judged as a shot transition interval by the wipe or special effect applying the spatio-temporal limiting condition when a maximum area, on which the intra-coded macroblocks are concentrated intensively, moves in a fixed direction on a continuous frame sequence.

11. The method of claim 10, wherein a movement of a center point, which is chosen by taking a center point of the area on which the intra-coded macroblocks are concentrated, on the temporal axis is regarded as the movement of the area on which the intra-coded macroblocks are concentrated.

12. A method for detecting a wipe and special effect of a video stream comprising consecutive frames having spatio-temporal relations, wherein the frames are constructed in a unit of macroblocks and wherein the macroblocks include intra-coded macroblocks, the method comprising:
   detecting an area on which intra-coded macroblocks are concentrated in a frame including macroblocks; and
   judging whether shot transition by wipe and special effect occurs by applying a spatio-temporal limiting condition to only the consecutive frames having the area on which the detected intra-coded macroblocks are concentrated, wherein the detection of the area on which the intra-coded macroblocks are concentrated is carried out by obtaining a projection histogram by projecting the intra-coded macroblocks in at least one direction in the compressed domain (space) by taking the intra-coded macroblocks as references and by calculating a projection histogram binary value by binarizing the projection histogram.

13. The method of claim 12, wherein the projection histogram is binarized by setting bins of which specific bin values exceed a predetermined threshold value by '1' and the rest by '0'.

14. The method of claim 12, wherein outliers or holes are removed from the binarized projection histogram.

15. The method of claim 14, wherein the outliers or holes are removed by selecting most frequently-used values by applying a window a size of which is 3 around the outliers or holes.

* * * * *